United States Patent Office 3,140,498
Patented July 14, 1964

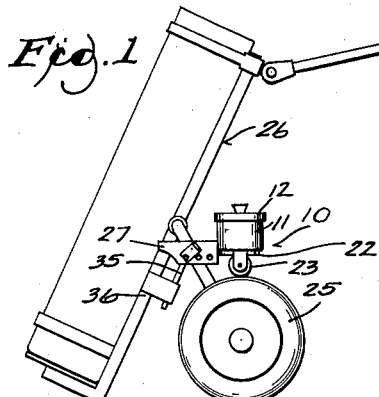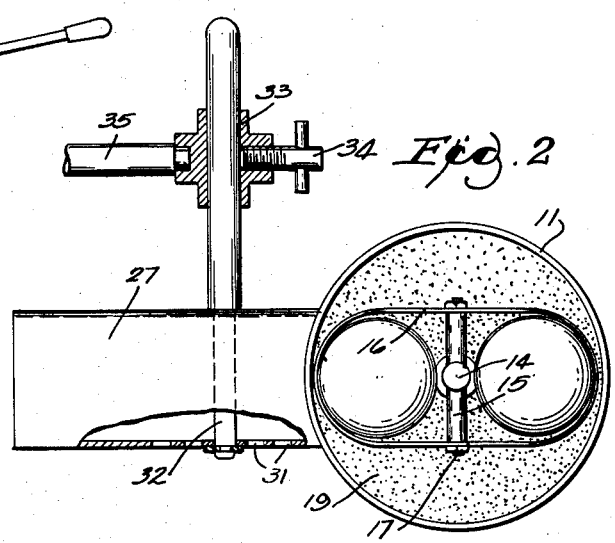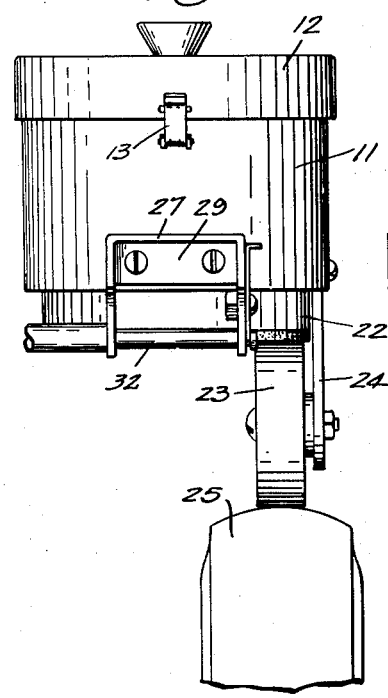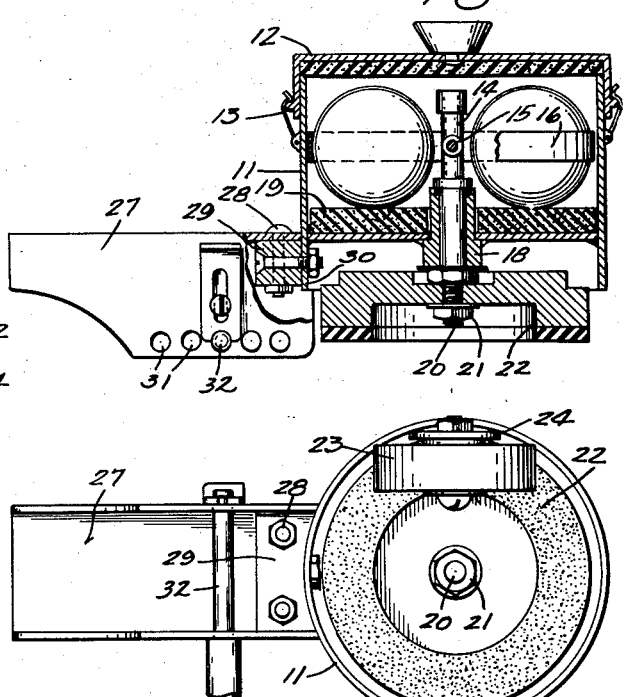
INVENTORS
WALTER B. DRESCHER
GEORGE T. NIEDERMEYER
BY
Gerald P. Welch
ATTORNEY

3,140,498
GOLF BALL WASHERS
Walter B. Drescher, 234 W. Mount Royal Road, Milwaukee, Wis., and George T. Niedermeyer, 10517 N. Circle Road, Mequon, Wis.
Filed Feb. 21, 1963, Ser. No. 260,268
1 Claim. (Cl. 15—97)

This invention relates to improvements in golf ball washers, and more particularly to a novel improved golf ball washer adapted for attachment to a conventional golf cart.

An object of the invention is to provide a device of the type which will move a plurality of golf balls immersed in liquid such as a fluid combined with a detergent during the travel of a golf cart to wash said golf balls.

Another object of the invention is to provide a simple and effective device of the type which will be economical of manufacture.

Other and further objects of the invention will appear as the description proceeds, reference being had to the accompanying drawing, in which:

FIG. 1 is side view of a golf cart equipped with a golf ball washer embodying the invention.

FIG. 2 is a plan view partly in elevation and partly in section of the device and related fittings.

FIG. 3 is a front view in elevation of the washer and a fragmentary view of a ground bearing wheel associated therewith on a golf cart.

FIG. 4 is a side view in vertical section of the device.

FIG. 5 is an inverted plan view of the washer.

Referring more particularly to the drawings, the numeral 10 refers to the device generally, having a fluid container 11, having a cover 12 provided with retainer clips 13.

Centrally and vertically disposed in the container 11 is a spindle 14 provided with a horizontal cross member 15 securing the band yoke 16 thereon by threaded means 17. A bearing 18 carries the spindle 14 and is encircled by a sponge rubber mat 19. At the lower end of the spindle 14, a bolt 20 and nut 21 secure the friction wheel 22. A drive wheel 23 is mounted on bracket 24 to bear against the friction wheel 22.

The drive wheel 23 normally rests against and is rotated by movement of the ground-bearing wheel 25 of the golf bag cart 26.

A bracket 27 is secured by threaded means 28 to the element 29, which in turn is secured to the flange portion 30 of the container 11. The bracket 27 is provided with rows of apertures as at 31 to receive the member 32 which is retained adjustably in sleeve 33 by the threaded means 34. A member 35 connects with a suitable fastening to the frame 36 of the golf bag cart 26.

In use, a quantity of fluid and detergent or other appropriate cleaning fluid is placed in the container 11, and the golf ball or balls to be cleaned are placed within the yoke 16. As the golf bag cart 26 is pushed over the ground it will be readily understood that the golf balls will be rotated thru the cleaning fluid over the mat 19, with the result that dirt or mud will be completely removed.

It will be understood that the device is capable of many modifications in structure and design, without departing from the spirit of the invention, within the scope of the appended claim.

Having thus described the invention, what is claimed and desired to be secured by Letters Patent of the United States, is:

In a golf ball washer, a container for cleaning fluid or the like, a rotatable vertical spindle centrally disposed within the container, means for engaging a plurality of golf balls for rotating them with said spindle through said fluid, a horizontal friction wheel fixed on the lower end of said spindle, and a vertical drive wheel engaged between said friction wheel and the ground-bearing wheel of a golf bag cart.

References Cited in the file of this patent

UNITED STATES PATENTS

| | | |
|---|---|---|
| 1,730,973 | Henrizi | Oct. 8, 1929 |
| 3,006,009 | Hoffecker | Oct. 31, 1961 |
| 3,041,645 | Smith | July 3, 1962 |
| 3,077,626 | Thomson | Feb. 19, 1963 |

FOREIGN PATENTS

| | | |
|---|---|---|
| 739,999 | Great Britain | Nov. 2, 1955 |